United States Patent
Johnson et al.

(10) Patent No.: US 9,036,864 B2
(45) Date of Patent: May 19, 2015

(54) BALL TRAJECTORY AND BOUNCE POSITION DETECTION

(75) Inventors: Henri Johnson, Winter Garden, FL (US); Stephen Corfield Pryce Parry, Le Vesinet (FR)

(73) Assignee: EDH Holdings (South Africa) (Pty) Ltd. (ZA)

( * ) Notice: Subject to any disclaimer, the term of this patent is extended or adjusted under 35 U.S.C. 154(b) by 120 days.

(21) Appl. No.: 13/572,238

(22) Filed: Aug. 10, 2012

(65) Prior Publication Data

US 2013/0039538 A1      Feb. 14, 2013

Related U.S. Application Data

(60) Provisional application No. 61/522,957, filed on Aug. 12, 2011.

(51) Int. Cl.
  *G06K 9/62* (2006.01)
  *G06T 7/20* (2006.01)

(52) U.S. Cl.
  CPC ......... *G06T 7/20* (2013.01); *G06T 2207/30224* (2013.01); *G06T 2207/30241* (2013.01)

(58) Field of Classification Search
  CPC ....................................................... G06K 9/62
  USPC ........................................................ 382/103
  See application file for complete search history.

(56) References Cited

U.S. PATENT DOCUMENTS

| 7,053,954 | B1 * | 5/2006 | Canini | 348/362 |
| 2002/0122115 | A1 * | 9/2002 | Harmath | 348/157 |
| 2004/0142772 | A1 * | 7/2004 | Asakura | 473/407 |
| 2006/0252017 | A1 | 11/2006 | Vorozhtsov et al. | |
| 2008/0024619 | A1 * | 1/2008 | Ono | 348/222.1 |
| 2008/0291216 | A1 * | 11/2008 | Cheng et al. | 345/619 |
| 2011/0267461 | A1 * | 11/2011 | Birenboim et al. | 348/142 |

FOREIGN PATENT DOCUMENTS

| WO | WO-0141884 A1 | 6/2001 |
| WO | WO-02053232 A2 | 7/2002 |
| WO | WO-2007035878 A2 | 3/2007 |
| WO | WO-2013025477 A1 | 2/2013 |

OTHER PUBLICATIONS

Recovering ball motion from a single motion-blurred image. Vincenzo Caglioti and Alessandro Giusti. Retreived http://dx.doi.org/10.1016/j.cviu.2008.01.008. 2008.*

A General Framework for 3D Soccer Ball Estimation and Tracking. Jinchnng Ren. James Orwell, Graeme A. Jones, Ming Xu. IEEE 2004.*

(Continued)

*Primary Examiner* — Stephen R Koziol
*Assistant Examiner* — Delomia Gilliard
(74) *Attorney, Agent, or Firm* — Schwegman Lundberg & Woessner, P.A.

(57) ABSTRACT

Disclosed in some examples is a method, system and medium relating to determining a ball trajectory and bounce position on a playing surface. An example method includes recording a first and a second sequence of ball images before and after a ball bounce on the playing surface; constructing a composite image of the trajectory of the ball from the first and second sequences; and determining a bounce position of the ball from the composite image.

25 Claims, 8 Drawing Sheets

(56) References Cited

OTHER PUBLICATIONS

Boracchi, Giacomo, et al., "Ball Position and Motion Reconstruction from Blur in a Single Perspective Image", Proceedings of ICIAP, (2007), 6 pgs.

Boracchi, Giacomo, et al., "Single-Image 3D Reconstruction of Ball Velocity and Spin from Motion Blur", Proceedings of the 3rd International Conference on Computer Vision Theory and Applications, (2008), 8 pgs.

Caglioti, V, "Ball trajectory reconstruction from a single long-exposure perspective image", Proc. of Workshop on Computer Vision Based Analysis in Sport Environments (CVBASE), (2007), 11 pgs.

Lin, Huei-Yung, et al., "Automatic Speed Measurements of Spherical Objects Using an Off-the-Shelf Digital Camera", Proceedings of the IEEE International Conference on Cechatronics, (2005), 6 pgs.

"International Application No. PCT/US2012/050284, International Search Report mailed Nov. 29, 2012", 4 pgs.

"International Application Serial No. PCT/US2012/050284, International Preliminary Report on Patentability mailed Feb. 27, 2014", 9 pgs.

"International Application Serial No. PCT/US2012/050284, International Search Report and Written Opinion mailed Nov. 29, 2012", 51 pgs.

"International Serial No. PCT/US2012/050284, International Written Opinion mailed Nov. 29, 2012", 9 pgs.

"Trajectory-based ball detection and tracking with aid of homography in broadcast tennis video", Visual Communications and Image Processing, (Jan. 30, 2007).

Caglioti, V., et al., "Recovering ball motion from a single motion-blurred image", Computer Vision and Image Understanding, Academic Press vol. 113, No. 5, (May 1, 2009), 590-597.

Gangal, Shantanu, et al., "The HawkEye Tecnology", MindSparks 2007 held at the College of Engineering (CoEP), Pune, India, (Dec. 14, 2007), 1-19.

* cited by examiner

BALL TRAJECTORY AND BOUNCE POSITION DETECTION

RELATED APPLICATIONS

This application claims the benefit to priority under 35 U.S.C. 119(e) to U.S. Provisional Patent Application Ser. No. 61/522,957, inventors Johnson and Parry, entitled "Ball Trajectory and Bounce Position Detection" filed Aug. 12, 2011, which is incorporated herein by reference in its entirety and made a part hereof.

BACKGROUND

The present disclosure relates to a method, system and medium for determining a ball trajectory and bounce position.

Officiating referees, judges and umpires in many sports including tennis, cricket and baseball, for example, use technology to assist in determining ball bounce positions or in making boundary crossing judgments according to the rules of the sport. This is also of interest in other sports such as baseball or golf, for example, to measure the flight path of the pitched or struck ball. Such measurements can provide indications of the performance of players and equipment.

The state of the art includes methods to track a moving ball by electronic cameras. These methods are commonly found in video tracking, for example, using multiple synchronized cameras that view a moving ball from multiple perspectives, with each camera recording images of the moving ball. Estimates can be made of the ball position in the image frames. The position of the ball can be calculated through triangulation. In order to be successful, the images typically rely on one or more of the following processes: (a) "finding" the ball in the image frame, usually by means of edge detection or correlation techniques, and estimating the position of the centroid of the object (i.e. the ball image), and (b) "normalization" of the image to intensity scales that allow the rules to "find" the ball in the image to work successfully.

SUMMARY

The present inventors have recognized, among other things, that a problem to be solved can include a trade-off between camera/image resolution and shutter speed. High resolution provides better definition of the ball in the image, but limits the number of images that can be taken during the ball's flight.

Illumination of the ball is often non-uniform, with one side strongly illuminated and an opposite side partly shaded. This can cause the edges of the ball on the shaded side to be poorly defined and therefore the apparent centroid of the ball is displaced from its true position. A fast-moving ball traversing the camera view will cause the ball image to be blurred. The trade-off between image quality and clarity, and the degree of blur can be reduced when the ball is very well illuminated, but cannot be assured during the real-life conditions of a sporting event.

Ball images can also suffer unwanted effects including full or partial occlusion by players and equipment, the shadows of players and equipment, the presence of ball logos, and other factors. This causes problems for the standard ball detection and processing methods.

The present subject matter can help provide a solution to these problems, such as by constructing a composite image of the ball trajectory from first and second sequences of ball images. In an example embodiment, the subject matter can allow three-dimensional ball tracking, including trajectory determination and bounce location, by constructing a tube-like composite image that can define a clear envelope that describes the ball trajectory and bounce location.

Example embodiments can be applied with or include a high-resolution camera (such as a current high-definition TV camera) with low frame rates such as 30 frames per second. In addition, shutter exposure times can be made as long as possible to create a desired blur effect allowing construction of a composite image. Longer shutter exposure times furthermore make it possible to operate successfully in lower light conditions. Further advantages and solutions can include those discussed further below in this specification.

To better illustrate the subject matter disclosed herein, some non-limiting summary examples are provided here.

Disclosed in some examples is a method for determining a ball trajectory and bounce position on a playing surface. The method may comprise recording a first and a second sequence of ball images before and after a ball bounce on the playing surface; constructing a composite image of the trajectory of the ball from the first and second sequences; and determining a bounce position of the ball from the composite image.

Disclosed in other examples is a system for determining a ball trajectory and a ball bounce position on a playing surface, the system comprising: at least one module, executing on one or more computer processors, to: receive data associated with a first and a second sequence of ball images recorded before and after a ball bounce on the playing surface; construct a composite image of the trajectory of the ball from the first and second sequences; and determine a bounce position of the ball from the composite image.

Disclosed in yet other examples is a machine readable medium, including instructions, which when performed by a machine, causes the machine to perform the operations of: recording a first and a second sequence of ball images before and after a ball bounce on a playing surface; constructing a composite image of the trajectory of the ball from the first and second sequences; and determining a bounce position of the ball from the composite image.

These and other examples and features of the present subject matter will be set forth in part in the following Detailed Description. These and the other examples and features can be combined in any permutation or combination. This overview is intended to provide non-limiting examples of the present subject matter. It is not intended to provide an exclusive or exhaustive explanation. The Detailed Description is included to provide further information about the present subject matter.

DETAILED DESCRIPTION

The following detailed description includes contemplated modes of carrying out exemplary embodiments of the subject matter. The description is not to be taken in a limiting sense, but is made merely for the purpose of illustrating the general principles of the subject matter, since the scope of the subject matter is best defined by the appended claims.

Currently, some ball trajectory systems calculate the instantaneous position of a moving ball by triangulation. Broadly, an example embodiment of the present subject matter proposes using the blur effect caused by the moving ball. Sequences of blurred or contiguous images of the ball are used to create a composite image of the trajectory of the ball. In a preferred embodiment, the longest possible camera shutter times are used to create the maximum amount of blur in each of a series of consecutive images of the ball's flight. A composite image can then be constructed using differencing and addition of the image sequences. This composite image exposes a tube-like representation of the ball's flight path against an uncluttered background. In this specification, the tube-like representation is also called a "tube". The tube defines the ball's flight path as accurately as the resolution of the camera that is used, and the blur effect provides almost continuous data of the ball's spatial movement. In this specification the word "ball" is used, but it is intended to include other objects that have a flight trajectory and/or a bounce position on contact with a surface. The object need not be round like a ball, for example it might be an arrow, a missile, or a shuttle-cock.

Broadly, an embodiment of the present subject matter generally provides a ball trajectory and bounce position detection system, comprising a first camera; a second camera; a computer, the computer being in communication with the first and the second camera, and operable to be controlled by an operator.

Figures 1, 2, 3:
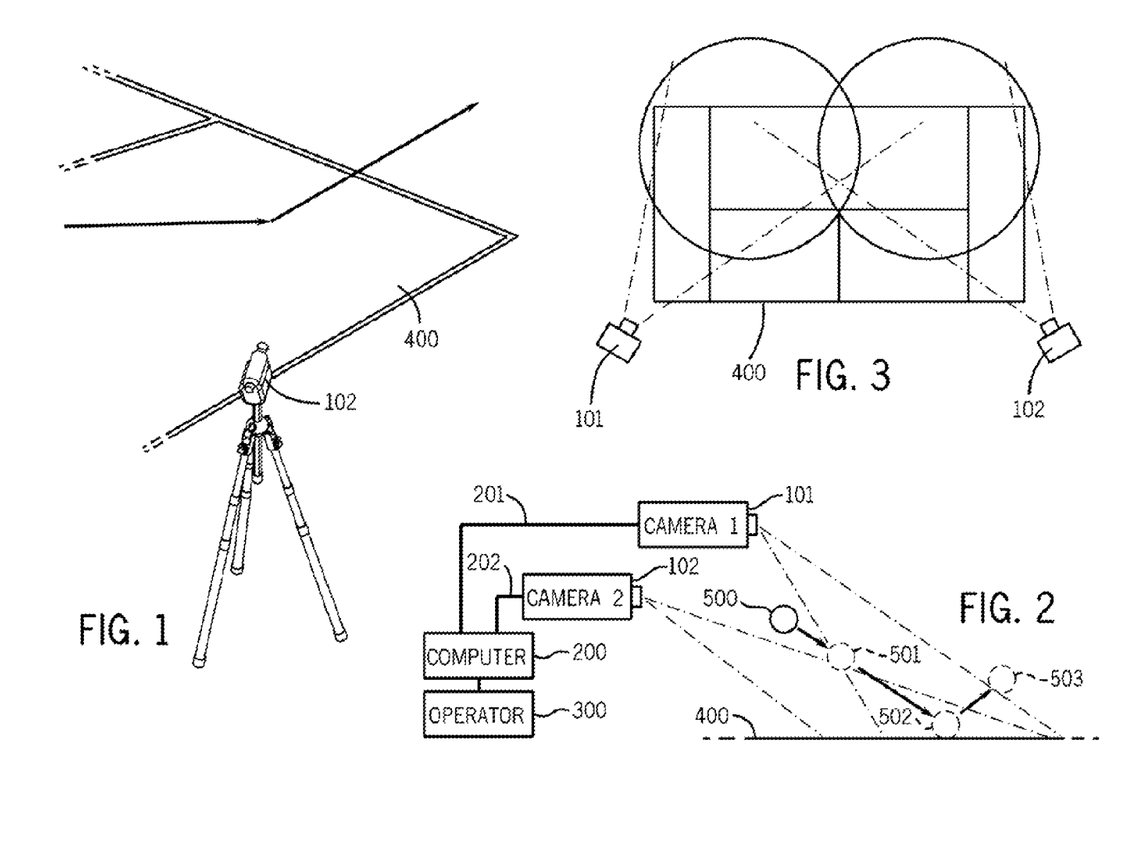
FIG. 1 is a detail oblique perspective view of an application of a ball trajectory and bounce position detection system according to an exemplary embodiment of the present subject matter.
FIG. 2 is a schematic diagram of the ball trajectory and bounce position detection system of FIG. 1.
FIG. 3 is a top plan view of an application of the ball trajectory and bounce position detection system of FIG. 1.

Referring now to FIGS. 1-3, a detail oblique perspective view of an application of a ball trajectory and bounce position detection system, a schematic diagram of the ball trajectory and bounce position, and a top plan view of an application of the ball trajectory and bounce position system are shown respectively. A first camera 101 and a second camera 102 may be configured to capture images of a playing surface 400. First and second cameras 101, 102 may be configured to capture images of an overlapping or intersecting area of playing surface 400, providing at least two perspectives thereof. First and second cameras 101, 102 may be high resolution cameras that may have a low frame rate and configured to have a shutter exposure to be as long as practically possible without saturation of the image. In example embodiments, a long shutter exposure allows the images of the trajectory of a ball in a sequence of images to be contiguous or blur somewhat, so that a substantially continuous trajectory of the ball is visible in at least one image in the sequence, or in the full sequence.

Referring now to FIG. 2, a system including first and second cameras 101, 102 may be in communication with a computer 200 by communication means 201 and 202 respectively. The computer may include one or modules, executing on one or more computer processors, configured to perform any one or more of the method steps described in this specification. Communication means 201 and 202 may include serial data cables or a wireless connection, for example. Computer 200 may include software to control first and second cameras 101, 102; download recordings therefrom; calibrate first and second cameras 101, 102; analyze images recorded therefrom; calculate and create a composite image or animation showing a tube-like envelope to illustrate a trajectory of a ball 500 on playing surface 400; and calculate a curve or discrete position values (e.g., positions 501, 502, 503) of ball 500 that may correspond to locations in the tube-like envelope of the ball trajectory. Computer 200 may also include software to calculate the trajectory of the ball relative to court 400 in real-world coordinates, using stereoscopic principles to combine data from first and second cameras 101, 102. First and second cameras 101, 102 may be synchronized and calibrated using standard methods to orient first and second cameras 101, 102 to playing surface 400 and particular landmarks thereon. The composite image or animation may be calculated and created using differencing and addition of image sequences. Computer 200 may be controlled by an operator 300, which may be a user who actively triggers aspects of the present subject matter, or an external device that may include ball detecting radar, or a ball strike detection component.

In an example method embodiment, one or more high resolution electronic cameras are set up next to the court and positioned and pointed to areas of interest such as the court lines. The cameras are set to operate with long duration exposure and a suitable frame rate e.g. 30 frames per second to capture the smeared or blurred images of a moving ball. The camera shutter exposure time is set to be as long as practically possible, ensuring only that there is no saturation of the image if the viewed area is bright.

Before play starts, the cameras are calibrated so that the relation between a camera pixel and the court's coordinates is known. All cameras are synchronized so that their frames are captured at the same moment. The recording of images commences when a trigger is provided. The trigger can be manually operated (e.g. a pushbutton) or may come from an external device such as ball detection radar. The image sequences recorded by the cameras are uploaded to a computer for processing.

The sequence of images from each camera is processed and combined to produce the tube-like trace of the ball's flight path. The ball trajectory is further analyzed to detect a bounce location, if any, by determining if and where a change in direction occurs. These combined images are processed to calculate data points or mathematical curves that represent the ball trajectory. The ball trajectory in real world coordinates can be then calculated using standard stereoscopic or triangulation methods to combine ball position data. If a bounce location is detected, the position of the bounce in real world coordinates can be calculated through triangulation.

Other features can include a device or method to automatically detect a strike of the ball, to indicate the start of an image capturing sequence. Other embodiments can include, methods or devices to adjust the field of view of the cameras, or methods or devices to rapidly steer the cameras to desired pointing angles or court positions, for example, thereby reducing the number of cameras required to cover a court. Multiple high-resolution cameras can, for example, be set up at different observation points to cover the field of play/court. Such cameras can be connected to a central computer that has software for camera control, image recording downloading, and image processing to produce ball trajectory and bounce position data.

In example embodiments, one or more high-resolution cameras are set up at different observation points to cover a field of play/court. The cameras and others are connected to a computer that is able to start and stop recordings as well as to control other settings as required for the application. Either wired or wireless connections can be used between the computer and the cameras. The computer may have software to download and store image recordings from the cameras. The computer may have software for calibrating the camera images relative to the court coordinates and to compensate for lens distortions. The computer may have software for analyzing recorded images from the cameras to create an image with a tube-like envelope of the ball trajectory (i.e. a "tube"). The computer may have software for calculating a mathematical curve or discrete position values that fit the tube-like envelope of the ball trajectory. The computer may have software for calculating the trajectory of the ball relative to the court in real world coordinates, using stereoscopic principles to combine data from the cameras. The computer may have software for determining a ball bounce and for calculating the ball bounce position. An example embodiment may determine the trajectory of a ball relative to the surface and/or boundary lines of a playing surface or court.

Figure 4:
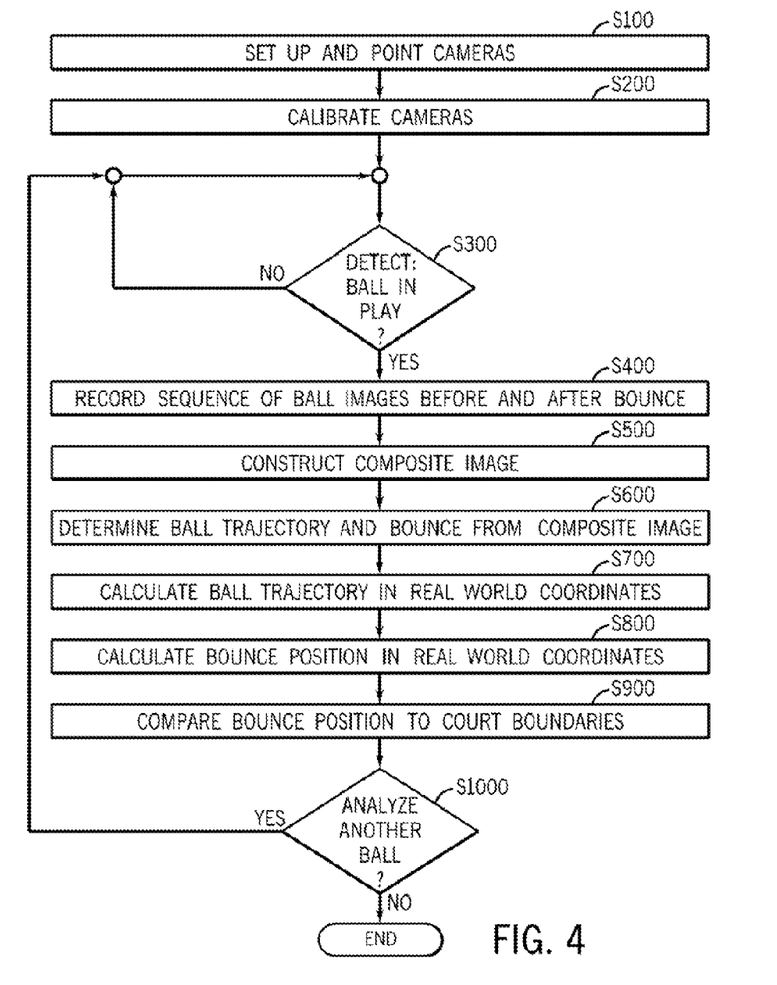
FIG. 4 is a process flow diagram of a ball trajectory and bounce position detection method according to an example embodiment of the present subject matter.

Referring now to FIG. 4, a process flow diagram is shown of a ball trajectory and bounce position detection method according to an exemplary embodiment of the present subject matter. Where steps below refer to a single camera, the intention is to extend the process to multiple cameras.

Step S100 may include setting up one or more cameras 101, 102 and others around the court 400 and to point the cameras at the areas of interest (such as the areas around boundary lines). When using more than one camera, the cameras may be linked so that the images are taken synchronously, that is, at the same time instants.

Step S200 may include calibrating the images from each camera 101, 102 and others to coordinates, such as real world coordinates, where pixel positions correspond to known court positions. This mapping may be used later to calculate ball positions from images. In addition the lens distortion for each camera may be determined by taking images of known reference grids temporarily placed in the fields of view of the cameras.

Step S300 may include a process to determine if the ball 500 is in play, to start the recording of a sequence of images. This could be a manually controlled action or be automated for example using a ball detecting radar or a microphone that detects the sound of a ball being struck.

Step S400 may include a process to record a sequence of successive images of the area of the court 400 where the ball 500 is expected to pass and/or bounce. The cameras 101, 102 and others may be set to have long exposure times resulting in smeared or blurred images of the moving ball 500. The smeared or blurred images may be tube-like and provide a well-defined envelope of the ball's position during the exposure time of each image.

Step S500 may include constructing a composite image by combining at least portions of the sequence of successive blurred ball images. The composite image may be created by numerical summation of the successive images.

Step S600 may include a process of analyzing the composite image to estimate a mathematical curve or any other description for example a set of discrete values that describe the trajectory of the ball 500 in the image. The trajectory may be estimated from the envelope of the smeared or blurred ball images that define the path of the ball.

Step S700 may include calculating the trajectory of the ball 500 relative to the court 400 and its lines, in coordinates such as real world coordinates. The construction of the trajectory may be done by standard methods of triangulation and uses the calibration data of each camera that was determined in step S200.

Step S800 may include a process to detect the occurrence of a bounce in the trajectory of the ball 500, by detecting a change in direction that occurs when the ball rebounds from the surface of the court 500. The process may include calculating the position on the court where the ball bounces.

In example embodiments, two or more high definition CCD cameras 101, 102 and others (such as Canon model EOS 5D) are set up on tripods next to a tennis court 400 for example and pointed to observe the serve line, base line, and side lines from different perspective directions. The cameras 101, 102 and others are connected to a computer 200 by means of serial data cables 201, 202 and others. The cameras 101, 102 and others are set up to operate with resolution of 1920×1080 pixels (HD 1080 p standard) and at a rate of 30 frames per second. The computer 200 is programmed to start and stop camera recordings on command by an operator 300.

The operator 300 starts the recording when the ball is hit, and stops it after the ball 500 has bounced. The computer 200 is programmed with software for calibrating each connected camera 101, 102 and others. The calibration procedure requires the position of each camera in relation to the court to be measured. For simplicity it is assumed that the camera lenses have fixed zoom settings and corresponding fields of view. The coordinates of the court 400 can be defined relative to the point on the surface in the center of the court below the net. Assuming a Cartesian coordinate system, the axes can be aligned with the court's lines. Further, each court feature (such as a line crossing or a corner) can be individually identified with its position within the coordinate framework known or measured.

To complete the camera setup calibration, the operator 300 selects to display the image from each camera on the computer display screen in turn. The operator inspects the image, identifies all visible court features, selects each feature's identity or name (e.g. Corner 1) and guides the cursor to confirm the selection on the image. The computer now records and assigns the feature's pixel position on the image. The operator continues to select and mark at least 3 features for each camera. The software will now have sufficient data to map pixel positions of images from multiple cameras to real court coordinates.

For the purpose of this description, it is assumed that each camera's lens distortion is determined in advance by taking images of reference grids placed temporarily in their fields of view, and the distortion characteristic of the lens calculated and saved. The computer 200 is programmed to download image recordings when the operator 300 chooses to do so. The computer 200 has a software program that constructs a composite image for each camera as follows: calculate the difference image for each sequential pair of images that are captured. This exposes the blurred ball trace and any other features in the image that have changed between the frames (e.g. moving player, equipment or shadow). All difference images can be stored. A composite image can be constructed that is the sum of all the difference images. This exposes a tube-like trace of the ball's trajectory in the camera's view.

The computer 200 has a software program that, for each camera view calculates the curve or set of discrete data points that best fits the tube-like trace of the ball's trajectory. The curves or data points that represent the ball's trajectory can be estimated by using any combination of known methods such as centroid detection, curve fitting, and filtering. The ball bounce can be detected by testing the progression of the curves or data points of the ball's trajectory for a deviation that indicates the deflection of the ball from the surface. The trajectory of the ball can be calculated in real world coordinates through standard methods of triangulation. Measurements from various cameras could be time-synchronized to aid this calculation. The bounce position could be used as a reference point in time and space to tie measurements from different cameras together.

Surface features such as court lines can be detected and measured from the camera images, using any combination of standard procedures to detect and locate features in images. This data can be used together with the ball trajectory and bounce position data to make or assist boundary rule judgments.

Example embodiments can be applied to a multitude of sports and also for other applications to track and locate fast-moving objects, such as in defense and physical sciences such as astronomy. Embodiments can also be used for example to measure a pitched baseball, determining the ball trajectory as well as the start points and strike zone positions accurately. In cricket bowling, the trajectory of the ball, bounce position and where applicable the post bounce trajectory can be plotted. In soccer, the trajectory of a ball from a penalty or corner kick can be determined. The subject matter can be used in any sport or application in which the trajectory of a moving ball or object or its bounce position is of interest. These are a few possible examples, but not an exhaustive list. For example, the application of the present subject matter also extends beyond umpire/referee judgment decisions. For example, sports instructors and coaches can use the information to assess player performance, television producers can use the measurements to enhance television broadcasts, and sports equipment manufacturers can use measurements for determining the performance of new equipment designs. In other applications, the moving ball or object need not necessarily be in flight in the air in order for its trajectory to be observed and recorded by means of the methods and systems described herein. For example, a moving golf ball on a putting green does not "fly" in the air but its "flight" over the ground could still be determined.

According to exemplary embodiments, a method of determining a ball trajectory and a ball bounce position on a playing surface comprises recording a first and a second sequence of ball images before and after a ball bounce on the playing surface; constructing a composite image from the first and second sequences; and determining a trajectory and a bounce position of the ball from the composite image. The composite image may include a tube-like image of the trajectory of the ball.

The method may further comprise setting up a first and a second camera for recording the first and second sequences of images; calibrating the first and second cameras; and detecting a ball in play. In example embodiments, setting up the first and second cameras includes configuring the cameras to record image from overlapping or intersecting regions of the playing surface. In example embodiments, the frame rate of at least one of the cameras is in the range 10-50 frames per second. In example embodiments, the shutter exposure of at least one of the cameras is set, relative to the ambient light conditions of the playing surface, to be as long as possible without saturation of the sequence of images recorded by the at least one camera. The method may further comprise calculating the coordinates of at least one position of the trajectory of the ball; calculating the coordinates of the bounce position; and comparing the coordinates of the bounce position to at least one location on the playing surface. The composite image may include a tube-like image of the trajectory of the ball.

Figure 5:
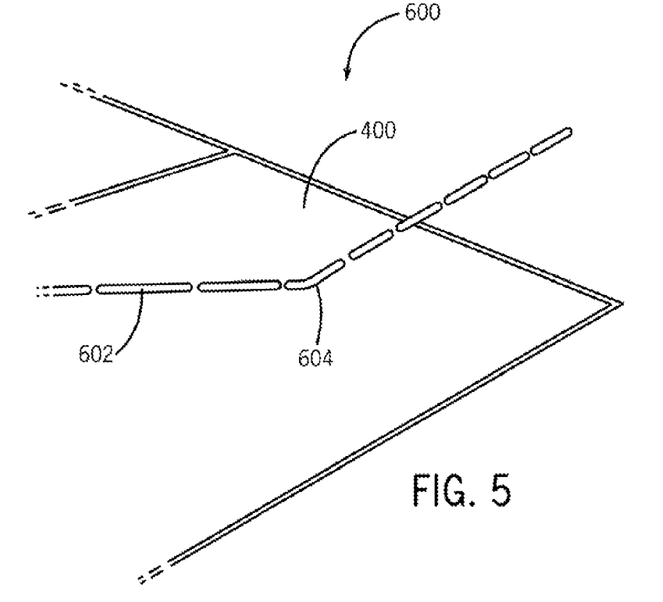
FIG. 5 is an image illustrating a visualization of a detected ball trajectory and bounce position, according to example embodiments.

Referring now to FIG. 5, an image 600 illustrating a visualization of a detected ball trajectory and bounce position is shown. The image may include a composite image calculated or produced from systems and methods of the present subject matter. The image may include a tube-like image 602 or envelope illustrating a ball trajectory or path and a bounce position 604.

Figure 6A:
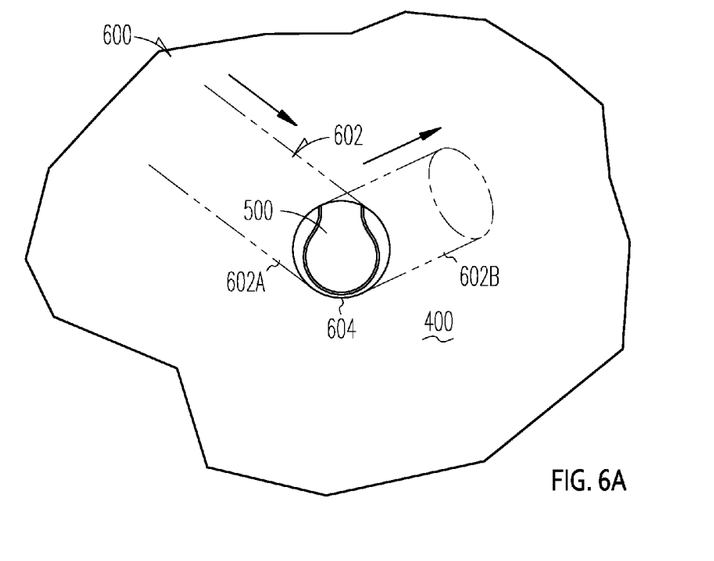
FIGS. 6A-6D show example images of a ball trajectory and bounce position, according to example embodiments.
Figure 6B:
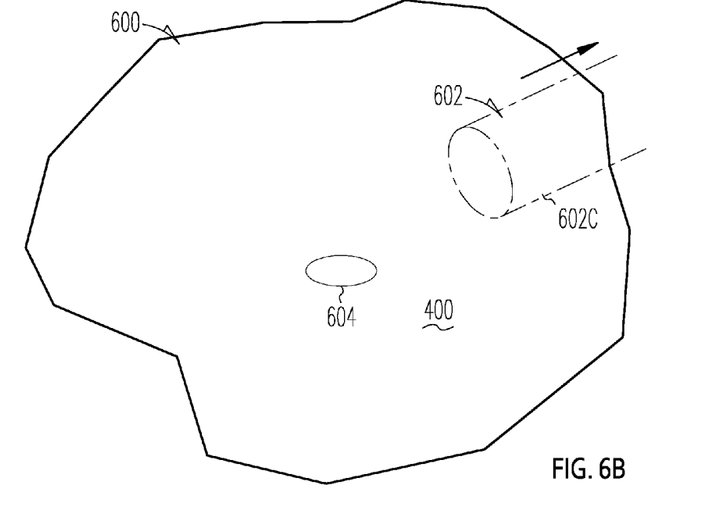
Figure 6C:
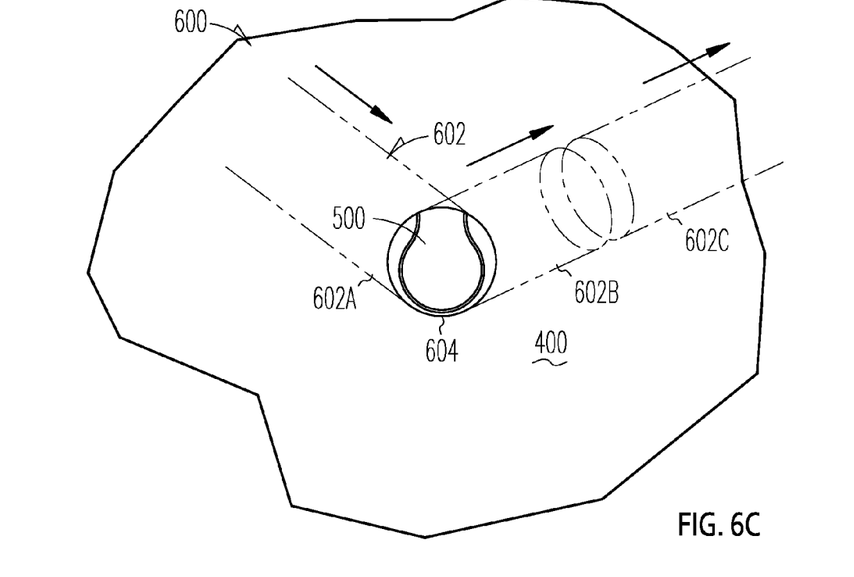

Reference is now made to FIGS. 6A-6D of the accompanying drawings. In FIGS. 6A-6C, an image 600 is shown and a portion of a playing surface 400 is visible in each image. A ball 500 can be seen traveling towards the surface 400 and bouncing off the surface 400 as shown in these views. The ball 500 has portions of its incoming and departing trajectories marked as 602A, 602B and 602C. The ball 500 has a bounce position shown generally at 604. A mark may be left by the ball 500 at the bounce position 604. The mark may also be recorded by one or both of the cameras 101 and 102.

FIG. 6A depicts an example of an image (or a sequence of images) of the ball 500 taken by camera 101, for example. In this image, the ball trajectory portions 602A and 602B are visible. Portion 602A is a portion of the ball trajectory just before the bounce, and 602B is a portion of the ball trajectory recorded shortly after the bounce. FIG. 6B depicts an example image (or sequence of images) of the ball 500, recorded by camera 102, for example. In this view, the ball trajectory portion 602C is visible. This portion of the ball trajectory is an example of what might be recorded by camera 102 a little later after the bounce, for example. The image or sequence of images shown in FIG. 6A might, for example, be taken by a camera looking side-on at the traveling ball and bounce position 604. The image or sequence of images in FIG. 6B might be taken, for example, by a camera located at a more oblique position on the court, relative to the ball and bounce position 604. The ball mark in this image might thus appear oval in outline, as shown. The ball trajectory portions 602A, 602B and 602C may be shown in tube-like form, as shown. Portions of the incoming and departing trajectories of the ball 500 are shown in FIG. 6A, and a portion of the departing trajectory shown in FIG. 6B. Other views of the trajectory are possible in either view. For example, both incoming and departing trajectory portions might be shown in FIG. 6B i.e. as recorded by the second camera, and only an incoming or departing portion recorded by the first camera shown in FIG. 6A, for example.

Irrespective of the positions of the first and second cameras, or the specific trajectory portions recorded by them, a composite image of the ball trajectory 602, comprising portions 602A, 602B and 602C of the ball trajectory, is constructed. The composite image shown in FIG. 6C is constructed from the respective sequences of ball images recorded by first and second cameras 101 and 102, as shown in FIGS. 6A and 6B. The trajectory 602 of the ball 500, and/or its bounce position 604 may be determined from the composite image. The coordinates of the ball trajectory and/or bounce position may be calculated by the computer 200, for example, and compared for example to coordinates or images of positions or areas (e.g. tram lines, base lines, corners, service areas) of the playing surface 400. The first and second cameras 101 and 102 may be high-resolution digital cameras and the sequence of images recorded before and after a bounce may be digital images.

Figure 6D:
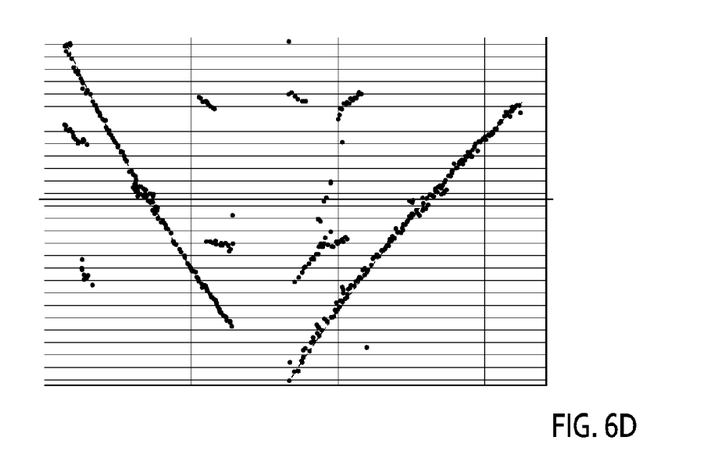

In an example embodiment, radar data, for example as shown in FIG. 6D allows an operator 300 to confirm the time of the bounce of the ball 500 and select one or more timed image frames, or image sequences, from camera 101 or 102 for further analysis. The ability to select frames just before or after a bounce, for example 0.01-1 seconds on either side of the bounce, minimizes the need for a computer 200 to analysis large amounts of data, for example comprising lengthy image sequences of a full trajectory of a ball 500 leaving a player's tennis racquet and traveling to a court surface 400, for example.

Figure 7:
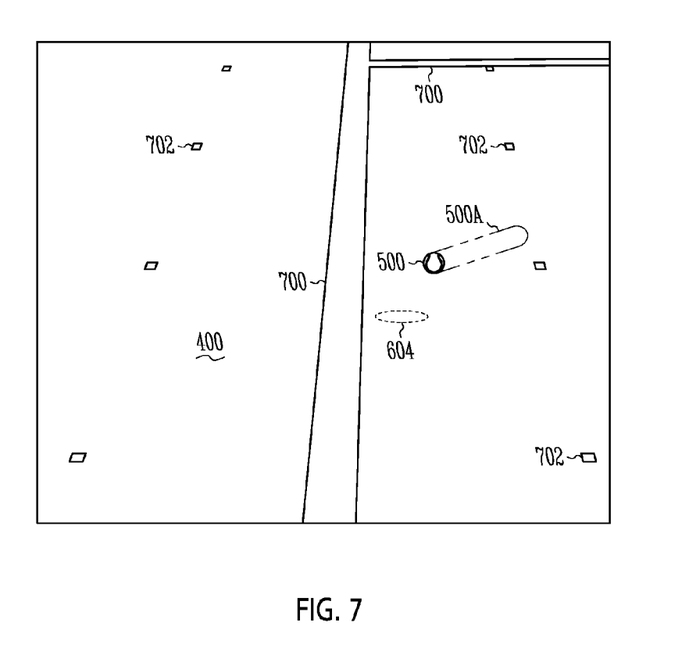
FIG. 7 shows an example image of a ball trajectory, according to an example embodiment.

Reference is now made to FIG. 7 of the accompanying drawings. This is an example illustration of a blurred or "smeared" trajectory 500A of a ball 500 depicted in a single camera frame. The ball is moving over a court or playing surface 400. Also visible in the view in FIG. 7 are court boundary lines 700, and calibration points 702. A series or sequence of such images of the moving ball 500, each showing a blurred image of a different or sequential part of the trajectory of the ball, may be constructed to create a composite image of a ball trajectory 602 as shown for example in FIG. 5 of the accompanying drawings. The composite image may be in three-dimensional tube-like form, as described elsewhere in this specification.

Figure 8A:
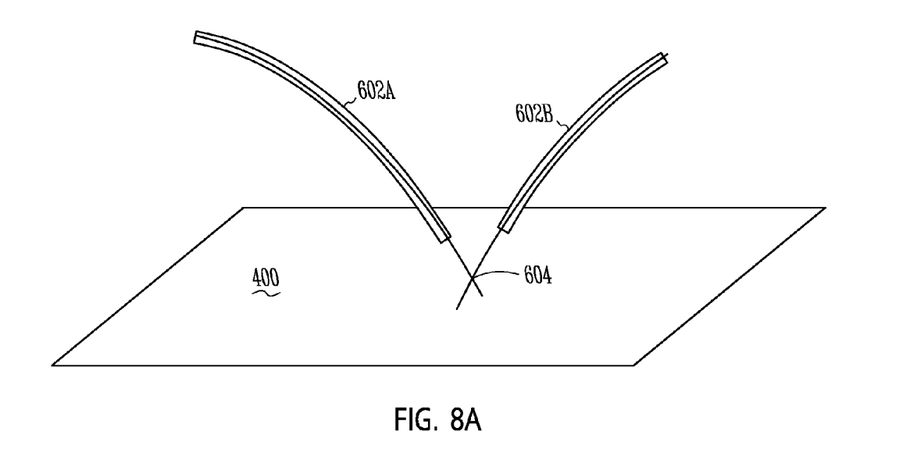
FIGS. 8A to 8C show schematic and example images of a ball trajectory and bounce position, according to example embodiments.
Figure 8B:
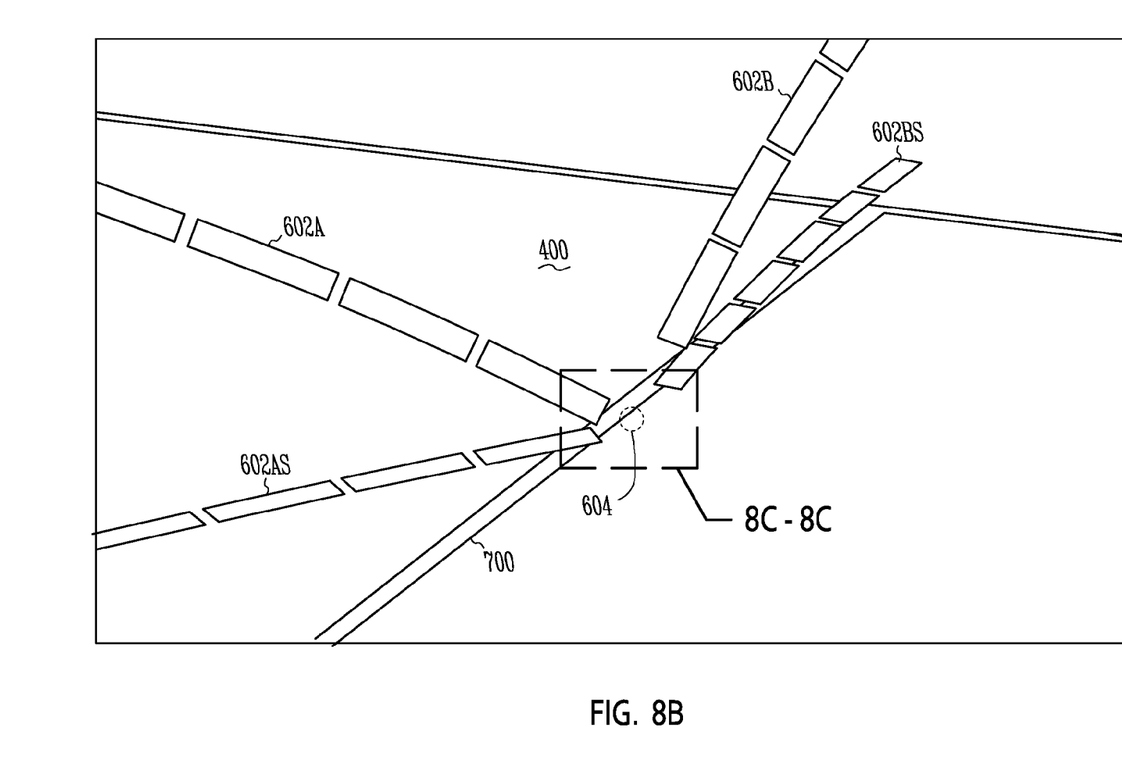
Figure 8C:
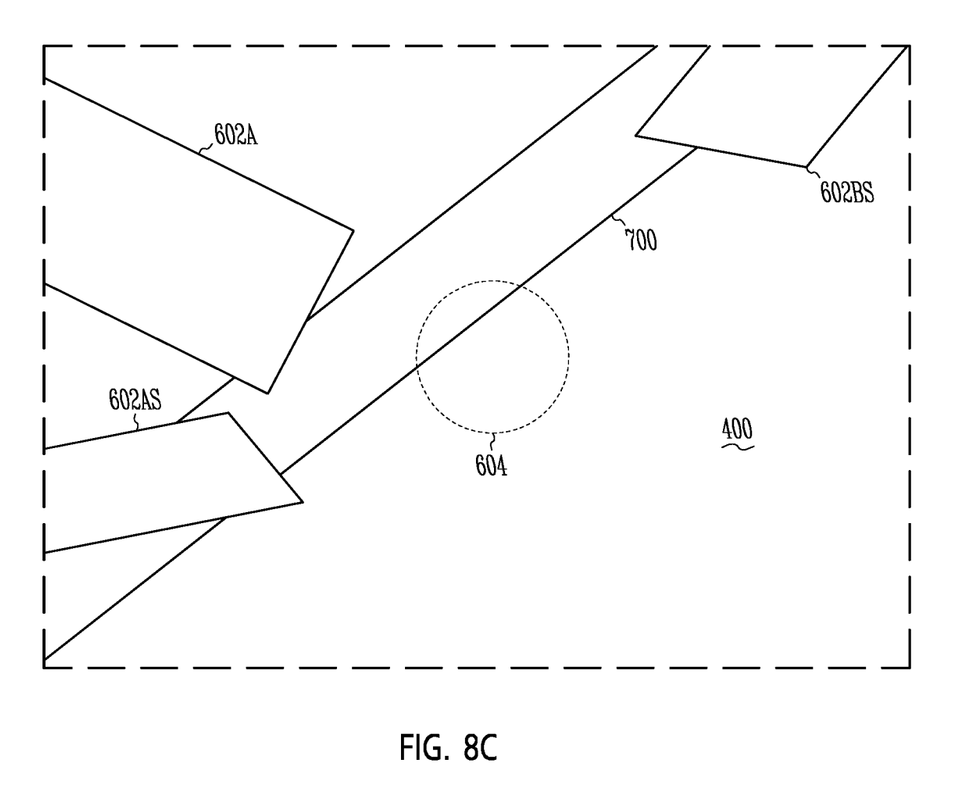

Reference is now made to FIGS. 8A to 8C of the accompanying drawings. Here, the coordinates of the bounce point 604 of the ball 500 are common to both the incoming 602A and the outgoing 602B trajectories. Hence, simultaneously solving the equation of the incoming trajectory 602A with the equation for the outgoing trajectory 602B produces the bounce point location 604. The shadow of the moving ball 500 may also be used as an additional "trajectory" which meets at the bounce point 604. For example, in FIG. 8B, the shadow of an incoming ball has a trajectory path 602AS, as well as an outgoing shadow trajectory path 602BS. These shadow trajectory images may also be composite images of the type described above, and can be used in conjunction with or separately from the real ball trajectories to detect the trajectory or bounce location of a ball. If used in conjunction with the non-shadow lines, four trajectories (instead of two) as shown for example in FIG. 8B can serve to increase the accuracy of identifying the trajectory and/or bounce location 604 of the ball 500. With reference to the enlarged view shown in FIG. 8C, a line judge or referee officiating at a tennis match for example, could view the composite image of the ball trajectory and determine that the bounce position 604 of a tennis ball 500 touched a court boundary line 700 and make a ruling in the match accordingly.

Further Examples

According to some exemplary embodiments, first and second cameras 101, 102 may have a frame rate of thirty (30) frames per second. According to some exemplary embodiments, the systems and methods described herein may be employed to officiate or judge sporting events including, for example, golf, baseball, basketball, soccer, football, cricket, or any other event or sport involving a ball or a plurality of balls striking a playing surface. According to other exemplary embodiments, cameras 101, 102 may include devices to allow computer 200 to rapidly steer or direct the cameras to a desired area on playing surface 400, thereby reducing the number of cameras needed to effectively cover playing surface 400.

In example embodiments, a system for determining a ball trajectory and a ball bounce position on a playing surface comprises at least one module, executing on one or more computer processors, to receive data associated with a first and a second sequence of ball images recorded before and after a ball bounce on the playing surface; construct a composite image from the first and second sequences; and determine a trajectory and a bounce position of the ball from the composite image. The at least one module may be further to assist calibration of the first and second cameras and detect a ball in play. The data associated with the first and second sequences of images may include data relating to recorded images from overlapping or intersecting regions of the playing surface.

In example embodiments, the received data includes data relating to images recorded by at least one camera having a frame rate in the range 10-50 frames per second. The received data may include data relating to images recorded by at least one camera having a shutter exposure set, relative to the ambient light conditions of the playing surface, to be as long as possible without saturation of the sequence of images recorded by the at least one camera. The at least one module may be further to calculate the coordinates of at least one position of the trajectory of the ball; calculate the coordinates of the bounce position; and compare the coordinates of the bounce position to at least one location on the playing surface.

In example embodiments, a machine readable medium, including instructions, which when performed by a machine, causes the machine to perform the operations of: recording a first and a second sequence of ball images before and after a ball bounce on a playing surface; constructing a composite image from the first and second sequences; and determining a trajectory and a bounce position of the ball from the composite image. The operations may further comprise: receiving data from a first and a second camera recording respectively the first and second sequences of images; calibrating the first and second cameras; and detecting a ball in play.

In example embodiments, the received data includes data relating to recorded images from overlapping or intersecting regions of the playing surface. The frame rate of at least one of the cameras may be in the range 10-50 frames per second. In example embodiments, the shutter exposure of at least one of the cameras may be set, relative to the ambient light conditions of the playing surface, to be as long as possible without saturation of the sequence of images recorded by the at least one camera.

In example embodiments, the operations further comprise: calculating the coordinates of at least one position of a trajectory of the ball; calculating the coordinates of the bounce position; and comparing the coordinates of the bounce position to at least one location on the playing surface.

The proposed subject matter can provide some improvements over existing methods in the following respects. For example, it allows the use of existing commercial cameras with low frame rates and high definition to be used to accurate track a fast moving ball. It can provide a precise and almost continuous trace of the ball's flight path, compared to the one or more instantaneous position points that can be detected by traditional ball-tracking cameras. The present subject matter is more tolerant of conditions such as occlusions by players, equipment and shadows that occur during practical sports games, since a series of images of the ball's flight can be constructed. The chance of all of these images being adversely affected is reduced.

By using longer shutter exposure times, the systems and methods can be used in conditions of poorer illumination. Longer exposure time allows the camera to collect more "photons" per pixel in its electronic imager compared to a high frame rate camera with short exposure time. This improves the quality of the image (signal to noise ratio) and results in smaller measurement errors, and ability to operate under more adverse lighting conditions that conventional camera tracking methods.

Non-Limiting Embodiments

It should be understood, of course, that the foregoing relates to exemplary embodiments of the subject matter and that modifications may be made without departing from the spirit and scope of the subject matter as set forth in the following claims. The above detailed description includes references to the accompanying drawings, which form a part of the detailed description. The drawings show, by way of illustration, specific embodiments in which the subject matter can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure, and in the United States to comply with 37 C.F.R. §1.72(b). The Abstract is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the subject matter should be determined with reference to the appended claims, along with the full scope of equivalents to which such claims are entitled.

What is claimed is:

1. A method of determining a ball bounce position on a playing surface, the method comprising:
    configuring a first camera and a second camera to operate with long duration exposure;
    recording, using the first camera and the second camera, a first and a second sequence of ball images before and after a ball bounce on the playing surface, the configuring of the first and second cameras to operate with long duration exposure causing the first and second sequences of ball images to include blurred images of the ball;
    constructing, one or more processors of a machine, a composite image of successive blurred ball images from the first and second sequences, the composite image of successive blurred ball images defining envelopes describing a ball trajectory before, during and after the ball bounce; and
    determining a bounce position of the ball from the composite image of successive blurred ball images.

2. The method of claim 1, further comprising:
    setting up the first and the second camera for recording the first and second sequences of images;
    calibrating the first and second cameras; and
    detecting a ball in play.

3. The method of claim 2, wherein setting up the first and second cameras includes configuring the cameras to record images from overlapping or intersecting regions of the playing surface.

4. The method of claim 2, wherein the frame rate of at least one of the cameras is in the range 10-50 frames per second.

5. The method of claim 2, wherein the shutter exposure of at least one of the cameras is set, relative to the ambient light conditions of the playing surface, to be as long as possible without saturation of the sequence of images recorded by the at least one camera.

6. The method of claim 1, further comprising:
    calculating the coordinates of at least one position of the trajectory of the ball;
    calculating the coordinates of the bounce position; and
    comparing the coordinates of the bounce position to at least one location on the playing surface.

7. A system for determining a ball bounce position on a playing surface, the system comprising:
    at least one module, executing on one or more computer processors, to:
        receive, from a first and a second camera, data associated with a first and a second sequence of ball images recorded before and after a ball bounce on the playing surface, the first and the second sequence of ball images including blurred images of the ball resulting from the first and the second camera being configured to operate with long duration exposure;
        construct a composite image of successive blurred ball images from the first and second sequences, the composite image of successive blurred ball images defining envelopes describing a ball trajectory before, during and after bounce; and
        determine a bounce position of the ball from the composite image of successive blurred ball images.

8. The system of claim 7, wherein the at least one module is further to:
    at least assist calibration of the first and second cameras; and
    detect a ball in play.

9. The system of claim 7, wherein the data associated with the first and second sequences of images includes data relating to recorded images from overlapping or intersecting regions of the playing surface.

10. The system of claim 7, wherein the received data includes data relating to images recorded by at least one camera having a frame rate in the range 10-50 frames per second.

11. The system of claim 7, wherein the received data includes data relating to images recorded by at least one camera having a shutter exposure set, relative to the ambient light conditions of the playing surface, to be as long as possible without saturation of the sequence of images recorded by the at least one camera.

12. The system of claim 7, wherein the at least one module is further to:
 calculate the coordinates of at least one position of the trajectory of the ball;
 calculate the coordinates of the bounce position; and
 compare the coordinates of the bounce position to at least one location on the playing surface.

13. A non-transitory machine readable medium, including instructions, which when performed by a machine, causes the machine to perform the operations of:
 configuring a first and a second camera to operate with long duration exposure;
 recording, using the first and the second camera, a first and a second sequence of ball images before and after a ball bounce on a playing surface, the configuring of the first and second cameras to operate with long duration exposure causing the first and second sequences of ball images to include blurred images of the ball;
 constructing a composite image successive blurred ball images from the first and second sequences, the composite image of successive blurred ball images defining envelopes describing a ball trajectory before, during and after the ball bounce; and
 determining a bounce position of the ball from the composite image of successive blurred ball images.

14. The medium of claim 13, wherein the operations further comprise:
 receiving data from a first and a second camera recording respectively the first and second sequences of images;
 calibrating the first and second cameras; and
 detecting a ball in play.

15. The medium of claim 14, wherein the received data includes data relating to recorded images from overlapping or intersecting regions of the playing surface.

16. The medium of claim 14, wherein the frame rate of at least one of the cameras is in the range 10-50 frames per second.

17. The medium of claim 14, wherein the shutter exposure of at least one of the cameras is set, relative to the ambient light conditions of the playing surface, to be as long as possible without saturation of the sequence of images recorded by the at least one camera.

18. The medium of claim 13, wherein the operations further comprise:
 calculating the coordinates of at least one position of a trajectory of the ball;
 calculating the coordinates of the bounce position; and
 comparing the coordinates of the bounce position to at least one location on the playing surface.

19. The method of claim 1, wherein the composite image of the trajectory of the ball is of tube-like form.

20. The system of claim 7, wherein at least one of the first and second sequences of images includes a blurred or contiguous image of the ball.

21. The system of claim 7, wherein the composite image of the trajectory of the ball is of tube-like form.

22. The medium of claim 13, wherein the composite image of the trajectory of the ball is of tube-like form.

23. A method of determining a ball trajectory, the method comprising:
 recording, using a first and a second camera configured to operate with long duration exposure, a first and a second sequence of images of the ball in flight, the first and the second sequence of ball images including blurred images of the ball resulting from the first and the second camera being configured to operate with long duration exposure;
 constructing, using one or more processors of a machine, a composite image of successive blurred ball images from the first and second sequences, the composite image defining envelopes describing the ball trajectory before, during and after a ball bounce; and
 determining at least one flight position of the ball from the composite image of successive blurred ball images.

24. A system for determining a ball trajectory, the system comprising:
 at least one module, executing on one or more computer processors, to:
  receive, from a first and a second camera, data associated with a first and a second sequence of images of the ball in flight, the first and the second sequence of ball images including blurred images of the ball resulting from the first and the second camera being configured to operate with long duration exposure;
  construct a composite image of successive blurred ball images from the first and second sequences, the composite image defining envelopes describing the ball trajectory before, during and after bounce; and
  determine at least one flight position of the ball from the composite image.

25. A non-transitory machine readable medium, including instructions, which when performed by a machine, causes the machine to perform the operations of:
 recording, using a first and a second camera configured to operate with a long duration exposure, a first and a second sequence of images of the ball in flight, the first and the second sequence of ball images including blurred images of the ball resulting from the first and the second camera being configured to operate with long duration exposure;
 constructing a composite image of successive blurred ball images from the first and second sequences, the composite image defining envelopes describing the ball trajectory before, during and after a bounce; and
 determining at least one flight position of the ball from the composite image of successive blurred ball images.

* * * * *